(12) United States Patent
Schmidt et al.

(10) Patent No.: US 7,264,071 B2
(45) Date of Patent: Sep. 4, 2007

(54) HYBRID POWERTRAIN

(75) Inventors: Michael R. Schmidt, Carmel, IN (US); Larry T. Nitz, Carmel, IN (US); Alan G. Holmes, Fishers, IN (US); Anthony H. Heap, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 128 days.

(21) Appl. No.: 10/843,903

(22) Filed: May 12, 2004

(65) Prior Publication Data
US 2005/0252703 A1  Nov. 17, 2005

(51) Int. Cl.
*B60K 6/02* (2006.01)

(52) U.S. Cl. ................... 180/65.6; 180/65.2; 180/65.3; 180/65.4; 475/5

(58) Field of Classification Search ............... 180/65.2, 180/65.3–4, 65.6–7; 475/5
See application file for complete search history.

(56) References Cited

U.S. PATENT DOCUMENTS

| | | | | |
|---|---|---|---|---|
| 5,931,757 | A  * | 8/1999 | Schmidt | 475/2 |
| 5,935,035 | A  * | 8/1999 | Schmidt | 475/5 |
| 6,251,037 | B1 * | 6/2001 | Baumgaertner et al. | 475/2 |
| 6,455,947 | B1 * | 9/2002 | Lilley et al. | 290/40 C |
| 6,551,208 | B1 * | 4/2003 | Holmes et al. | 475/5 |
| 6,579,201 | B2 * | 6/2003 | Bowen | 475/5 |
| 6,964,627 | B2 * | 11/2005 | Ai et al. | 475/5 |
| 2005/0049100 | A1 * | 3/2005 | Ai et al. | 475/5 |

* cited by examiner

*Primary Examiner*—Christopher P. Ellis
*Assistant Examiner*—Vaughn T. Coolman

(57) ABSTRACT

A hybrid powertrain incorporates an engine, two motor/generator mechanisms, and a planetary gearset. The planetary gearset has at least one torque-transmitting mechanism, which may be selectively energized to provide a brake on one of the motor/generators thereby reducing the electrical power generation within the hybrid transmission.

7 Claims, 4 Drawing Sheets

HYBRID POWERTRAIN

TECHNICAL FIELD

This invention relates to vehicle powertrains and, more particularly, to powertrains having a mechanical power source and electrical drive components in combination with planetary gearing.

BACKGROUND OF THE INVENTION

Hybrid powertrains incorporating electrically-variable transmissions (EVT) have been proposed by many sources. The typical hybrid powertrain includes an internal combustion engine and a plurality of electrical motor/generators, the power output of which are combined through planetary gearing to produce an output drive for the vehicle powertrain.

The electrical units are capable of operating as electric motors or as generators. In the motor phase, they of course provide power to the transmission, and in the generator phase, they take power from the transmission. In many of the hybrid powertrains incorporating an EVT, at least one and generally two pure mechanical points are arrived at during the operation of the powertrain. At a mechanical power point, at least one of the electrical units is at zero speed, thus providing a ground mechanism for a portion of the planetary transmission.

When the electrical unit is at zero speed, it is generally operating as a brake or a retarding device and therefore still requires energy to maintain sufficient torque to prevent the components connected therewith from rotating. This electrical energy, which is distributed to the unit, produces heat within the transmission and must be dispersed through the cooling system. While the overall efficiency of the powertrain at the mechanical point is improved, it could be more greatly improved if the electrical unit was not absorbing the energy required for braking.

SUMMARY OF THE INVENTION

It is an object of the present invention to provide an improved hybrid powertrain wherein at least one mechanical drive point is achieved through the braking of one of the electrical units.

In one aspect of the present invention, a hybrid powertrain is provided to establish three drive conditions between the engine and the final drive mechanism.

In another aspect of the present invention, the hybrid powertrain includes a gasoline engine, two electrical drive units, a plurality of gear members, and three torque-transmitting mechanisms.

In yet another aspect of the present invention, one of the torque-transmitting mechanisms is connected between a stationary transmission portion and one of the electrical units.

In still another aspect of the present invention, the one torque-transmitting mechanism is engaged during a cruise condition within the powertrain wherein power flow from the engine to the output is purely mechanical and one electrical unit is disconnected from input power.

DESCRIPTION OF AN EXEMPLARY EMBODIMENTS

Figure 1:
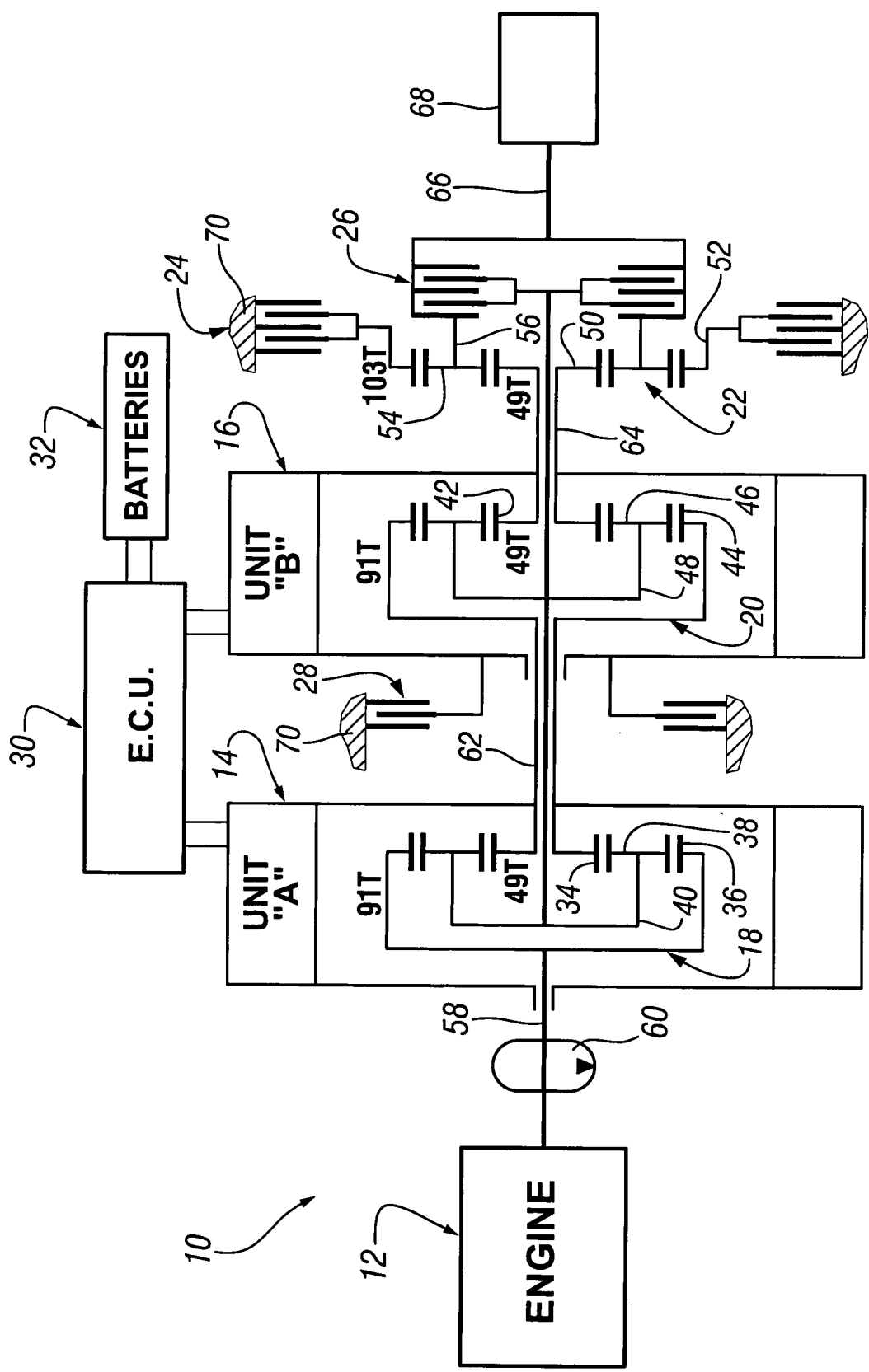
FIG. 1 is a schematic representation of a hybrid powertrain incorporating the present invention.

Referring to the drawings, wherein like characters represent the same or corresponding parts throughout the several views, there is seen in FIG. 1 a hybrid powertrain 10 having an internal combustion engine 12, a first electrical unit or motor/generator (MG) 14, a second electrical unit or motor/generator (MG) 16, three planetary gearsets 18, 20, and 22, and three torque-transmitting mechanisms 24, 26, and 28.

The electrical units 14 and 16 are electrically interconnected with a conventional electronic control unit (ECU) 30, which in turn communicates with an energy storage source 32 generally comprised of a plurality of batteries. The ECU 30 distributes power to and from the electrical units 14 and 16 and the batteries 32 and also communicates control signals with the electrical units which are issued to control the speed and torque of the electrical units 14 and 16.

The planetary gearset 18 includes a sun gear member 34, a ring gear member 36, and a plurality of pinion gears 38 rotatably mounted on a planet carrier member 40. The planetary gearset 20 includes a sun gear member 42, a ring gear member 44, and a plurality of pinion gears 46 rotatably mounted on a planet carrier member 48. The planetary gearset 22 includes a sun gear member 50, a ring gear member 52, and a plurality if pinion gears 54 rotatably mounted on a planet carrier member 56. In the preferred embodiment shown in FIG. 1, the ring gear to sun gear tooth ratio is 91:49 for planetary gearsets 18, 20 as illustrated by corresponding elements 91T and 49T, and 103:49 for planetary gearset 22 as illustrated by corresponding elements 103T and 49T, identifying the number of teeth.

A transmission input shaft 58 is drivingly connected between the engine 12 and the ring gear member 36. The input shaft 58 also drives a conventional hydraulic pump 60. The sun gear member 34 and ring gear member 44 are interconnected by a shaft member 62, which is also drivingly connected with the electrical unit 14.

The planet carrier member 40 is rotatably connected with the planet carrier member 48 and also with the torque-transmitting mechanism 26. The sun gear member 42 is continuously drivingly connected through a shaft 64 with the sun gear member 50 and also drivingly connected with the electrical unit 16.

The planet carrier member 56 is drivingly connected with the torque-transmitting mechanism 26 such that when the torque-transmitting mechanism 26 is engaged the planet carrier members 40 and 48 are connected with the planet carrier member 56 and also with a transmission output shaft 66. The transmission output shaft 66 is connected with a final drive mechanism 68, which incorporates mechanisms such as wheels to drive the vehicle.

The ring gear member 52 is operatively connected with the torque-transmitting mechanism 24. The electrical unit 16 is continuously connected with the sun gear members 42 and 50 and also operatively connected with the torque-transmitting mechanism 28. The torque-transmitting mechanisms 24 and 28 are typical reaction clutches or brakes and are connected with a transmission housing or other stationary portion 70. Thus, when the torque-transmitting mechanism 24 is engaged, the ring gear member 52 is stationary and when the torque-transmitting mechanism 28 is engaged the electrical unit 16 and the sun gear members 50 and 42 are stationary.

Figure 3:
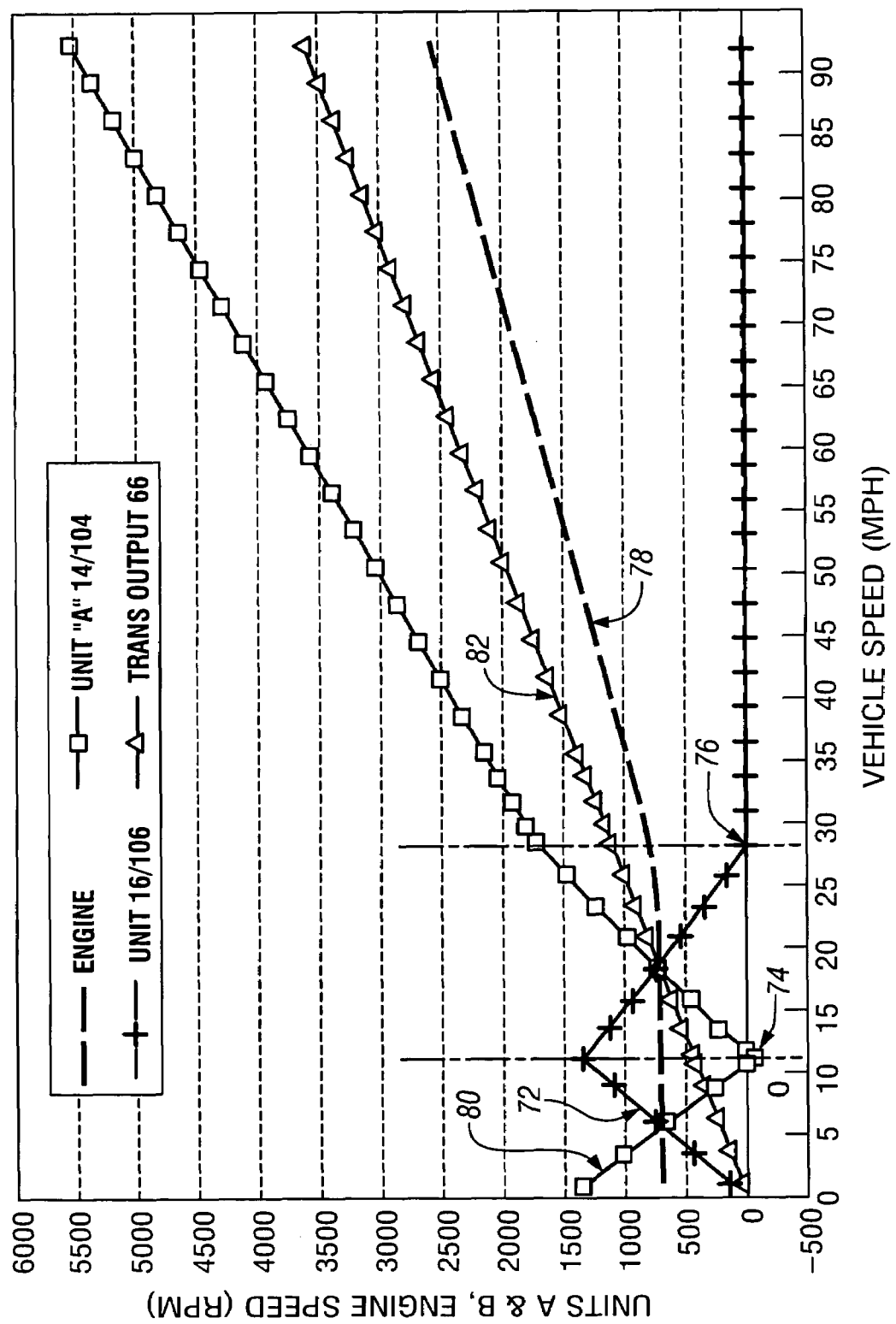
FIG. 3 is a chart having a plurality of curves describing some of the operating characteristics of the present invention.

The chart in FIG. 3 describes the speeds of the engine 12, the electrical unit 14, the electrical unit 16, and the transmission output shaft 66. As can be seen in FIG. 3, the speed of electrical unit 106 increases along a curve 72 from the origin to a point 74 and then decreases to zero speed at a point 76. The engine speed represented by the curve 78 is substantially constant at approximately 700 rpm from the origin to the point 76. The speed of unit 104 represented by the curve 80 begins at the origin at a speed of approximately 1300 rpm and decreases steadily to reach a negative value at point 74 and then increases at a first rate to point 76 and at a second rate thereafter. The transmission output speed represented by the curve 82 steadily increases from the origin throughout the entire operating range.

During operation from the original to the point 74, the torque-transmitting mechanism 24 is engaged and both of the electrical units 14 and 16 operate as generators between the original and point 74. However, at approximately point 74, the electrical unit 14 operates as a motor, especially during the negative portion of the speed curve. At point 74, a synchronous shift between the torque-transmitting mechanisms 24 and 26 occurs wherein the torque-transmitting mechanism 24 is disengaged and the torque-transmitting mechanism 26 is engaged. From the point 74 to the point 76 on the chart, electrical unit 14 operates as a generator. That is, when operating as a generator electrical units 14 and 16 are providing reactions within the powertrain and are developing electrical power, which is then stored in the batteries 32.

As the electrical unit 16 approaches the zero speed point 76, the operation of the unit becomes that of a motor. When the point 76 is reached, the torque-transmitting mechanism 28 is engaged synchronously since the speed of unit 106 is zero and both sides of the torque-transmitting mechanism 28 are zero. After the torque-transmitting mechanism 28 has been engaged, the electrical power to the electrical unit 16 is discontinued and therefore the heat generated by the electrical unit 16 will be discontinued. From the point 76 outward toward the upper end of the operating range, the powertrain is a purely mechanical powertrain, that is, engine power only is directed through the planetary gearsets between the input shaft 58 and the output shaft 66. The electrical unit 104, during this operation, operates as a generator to supply electrical power for the various electrical operating mechanisms of the vehicle.

The chart of FIG. 3 represents a cruise condition of operation. That is, the vehicle is running or being driven on a substantially level ground. Under these conditions, the use of only the engine 12 is fairly economical operation since the powertrain for the use in larger vehicles such as trucks requires a substantial engine. Other operating conditions, such as full power and hill climbing require other operating conditions and the zero speed points for the electrical units will occur at different locations along the speed curve.

It is important to note here that the powertrain becomes a substantially mechanical powertrain during operation from point 76 outward toward the maximum end of the speed curves.

Figure 2:
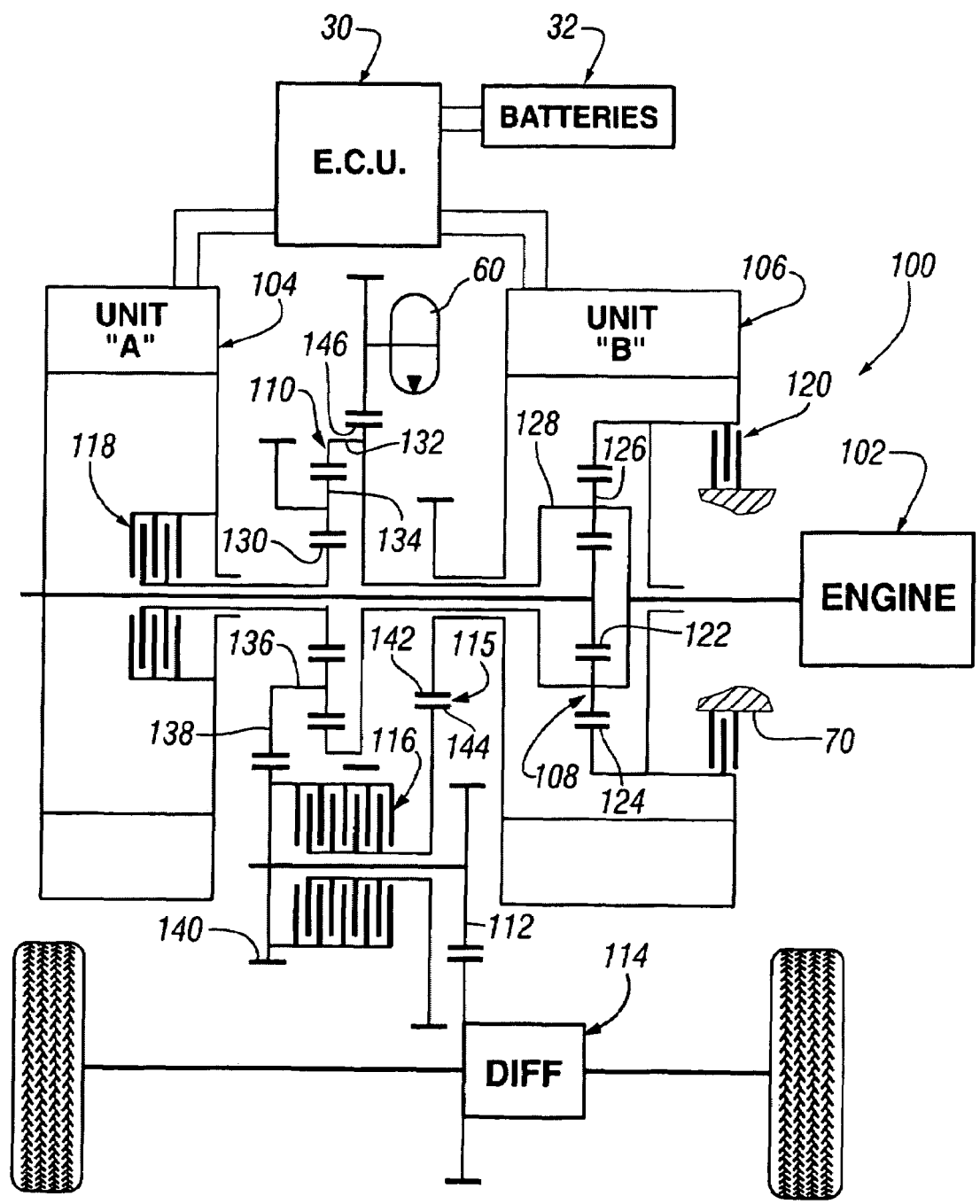
FIG. 2 is a schematic representation of another embodiment of the present invention.

The powertrain described above for FIG. 1 is concerned with a rear wheel drive front engine powertrain. The powertrain 100 shown in FIG. 2 is designed to operate in a front wheel drive powertrain with a front drive engine. The powertrain 100 described in FIG. 2 includes an engine 102, a first electrical unit or motor/generator 104, a second electrical unit or motor/generator 106, a planetary gearset 108, and a second planetary gearset 110. The powertrain 100 also includes a transfer gear mechanism 112 between the planetary gearset 110 and a transmission output 114, and a transfer gear mechanism 115 disposed between the electrical unit 106 and a torque-transmitting mechanism 116. The powertrain 100 also has a second torque-transmitting mechanism 118, and a third torque-transmitting mechanism 120.

The planetary gearset 108 includes a sun gear member 122, a ring gear member 124, and a plurality of pinion gears 126 rotatably mounted on a planet carrier member 128. The planetary gearset 110 includes a sun gear member 130, a ring gear member 132, and a plurality of pinion gears 134 rotatably mounted on a planet carrier member 136. The transfer gear mechanism 112 includes a pair of meshing gears 138 and 140 and the transfer gear mechanism 115 includes a pair of meshing gears 142 and 144.

The engine 102 is drivingly connected with the planet carrier member 128 and the ring gear member 132. A power take-off gear 146 is present to provide a drive for the hydraulic pump 60. The sun gear member 122 is drivingly connected with the electrical unit 104. The electrical unit 104 is also selectively connectible with the sun gear member 130 through the actuation of the torque-transmitting mechanism 118. The ring gear member 124 is drivingly connected with the motor/generator 106 and with the selectively engageable torque-transmitting mechanism 120, which is connected with the transmission housing 70. Thus, on actuation of the torque-transmitting mechanism 120, the ring gear member 124 and electrical unit 106 will both be held stationary.

The torque-transmitting mechanism 116 is operatively connectible between the gear member 140 and the gear member 144. Selective engagement of the torque-transmitting mechanism 116 will provide a drive connection between the electrical unit 106 and the output mechanism 114. The planet carrier member 136 is continuously connected with the output mechanism 114 through the transfer gear mechanism 112.

The powertrain 100 shown in FIG. 2 will provide the same operating characteristics as the powertrain 10 shown in FIG. 1, such that the same operating curve of FIG. 3 will be available to it. During the first phase of operation, the torque-transmitting mechanism 116 is engaged while the torque-transmitting mechanisms 118 and 120 are disengaged. During this operation, the electrical units 106 and 104 operate as generators to provide reaction within the system while the engine 102 provides mechanical drive for the vehicle.

At the zero speed point of unit 104, represented by point 74, the torque-transmitting mechanism 116 is disengaged while the torque-transmitting mechanism 118 is engaged under synchronous speed conditions. That is, both sides of the torque-transmitting mechanism 118 are operating at the same speed during engagement. At zero speed point of unit 106, the torque-transmitting mechanism 120 is synchronously engaged since the speed of unit 106 is zero as is both sides of the torque-transmitting mechanism 120. The further operation after the zero point 76 of unit 106 is a purely mechanical operating mechanism such that neither electrical units 104 or 106 provide reaction mechanisms within the system. The electrical unit 104 does continue to provide electrical energy for the electrical mechanisms of the powertrain and of the vehicle.

Figure 4:
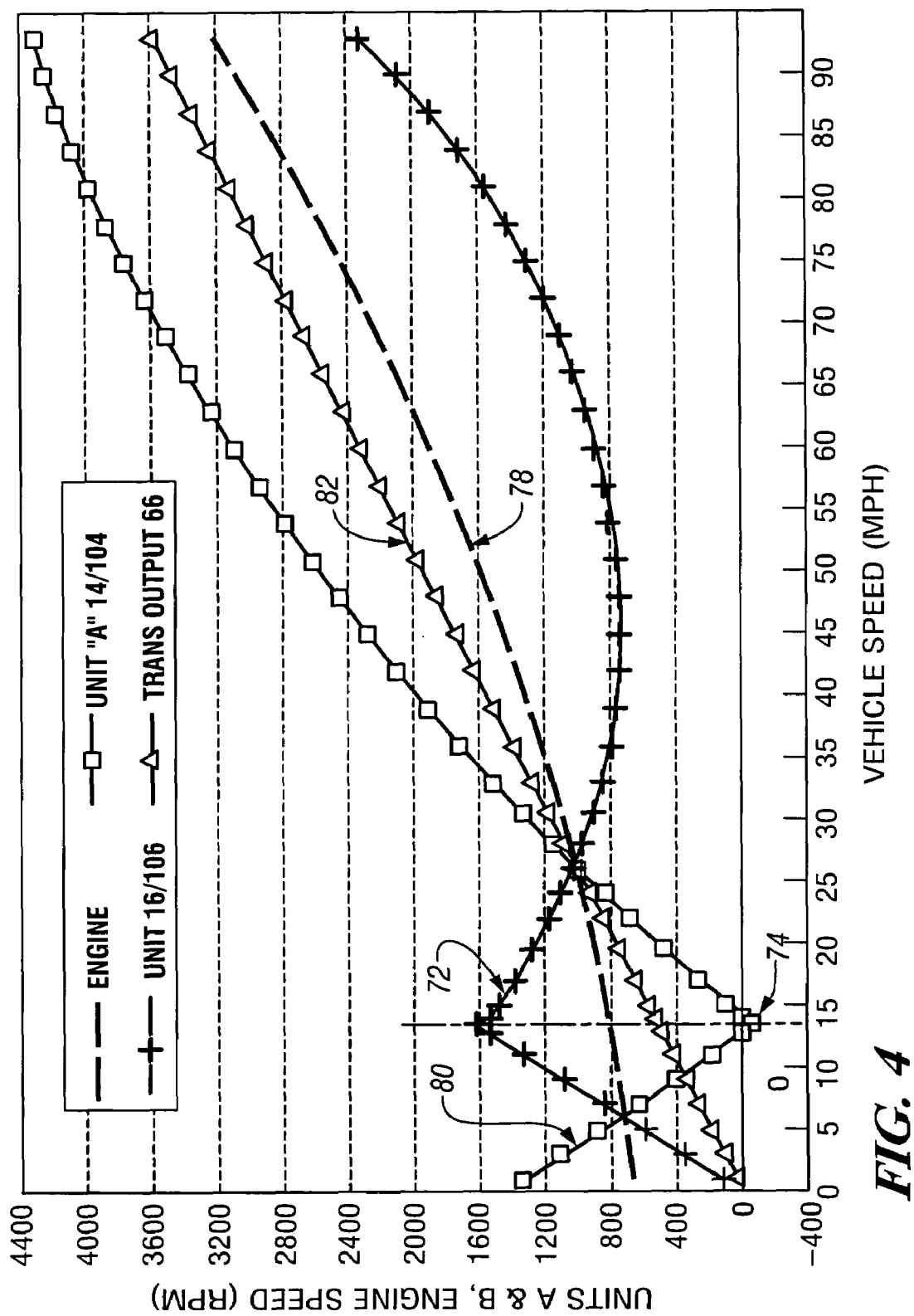
FIG. 4 is a chart having a plurality of curves describing operating characteristics of the powertrain during operation on a surface with a grade.

FIG. 4 is a chart similar to FIG. 3 and represents the powertrain during higher power output requirements during operation on a three (3%) percent grade. It will be noted that unit 16/106 does not reach zero and the clutch 28/120 is never engaged.

Except during a light cruise condition, as shown in FIG. 3, the powertrain 10 will always operate with a continuously variable transmission and the engine will always operate on the best fuel curve. This permits more power to be distributed to the final drive of the vehicle so that hill climb and acceleration needs are met. During this full power or hill climb operation, the torque-transmitting mechanism 28 in FIG. 1 and torque-transmitting mechanism 120 in FIG. 2 are disengaged permitting the electrical unit 16/106 to rotate.

The invention claimed is:

1. A hybrid powertrain comprising:
   an engine;
   a first motor/generator;
   a second motor/generator;
   a transmission output;
   at least two planetary gearsets selectively interconnecting said engine, said first motor/generator, and said second motor/generator to supply power to said transmission output, each of said gearsets having a plurality of gear elements; and
   a torque-transmitting mechanism selectively connectible between said second motor/generator and a stationary member of said transmission to prevent rotation thereof and eliminate electrical power generation thereby, said torque transmitting mechanism being directly connected to said stationary member and said second motor generator, and continuously connected to at least one of said plurality of gear elements of each of a pair said at least two planetary gearsets.

2. The hybrid powertrain of claim 1, wherein said gear elements comprise a sun gear, ring gear, and carrier.

3. A hybrid powertrain comprising:
   an engine;
   a first motor/generator;
   a second motor/generator;
   a transmission output;
   first and second planetary gearsets selectively interconnecting said engine, said first motor/generator, and said second motor/generator to supply power to said transmission output, each of said first and second planetary gearsets having a plurality of gear elements;
   first and second torque-transmitting mechanisms being operable to provide a synchronous shift; and
   at least one additional torque-transmitting mechanism, wherein said at least one additional torque-transmitting mechanism is a brake which is selectively connectible directly between said second motor/generator and a stationary member of said transmission to prevent rotation thereof and eliminate electrical power generation thereby, said at least one additional torque transmitting mechanism being directly connected to said stationary member and said second motor/generator, and continuously connected to at least one of said plurality of gear elements of each of said first and said second planetary gearsets.

4. The hybrid powertrain of claim 3, wherein said synchronous shift results in a different speed relationship between said engine, said transmission output, and said first and second motor/generators.

5. The hybrid powertrain of claim 3, wherein said second motor/generator is continuously connected to a sun gear of said first planetary gearset and to a sun gear of said second planetary gearset.

6. A hybrid powertrain comprising:
   an engine;
   a first motor/generator;
   a second motor/generator;
   an energy storage device for interchanging electrical power with said first and second motor/generators;
   a control unit for regulating the electrical power interchange between said energy storage device and said first and second motor/generators and also for regulating electrical power interchange between said first and second motor/generators;
   a transmission output;
   first and second gear elements directly and continuously connected to one of said motor/generators, wherein said first gear element is a sun gear member of a first planetary gearset, and said second gear element is a gear element of a second planetary gearset; and
   a torque-transmitting mechanism directly and selectively connecting said one of said motor/generators with a stationary member, and that is continuously connected to said first and said second gear element.

7. The hybrid transmission of claim 6, wherein said second gear element is a sun gear of said second planetary gearset.

* * * * *